Patented Feb. 8, 1944

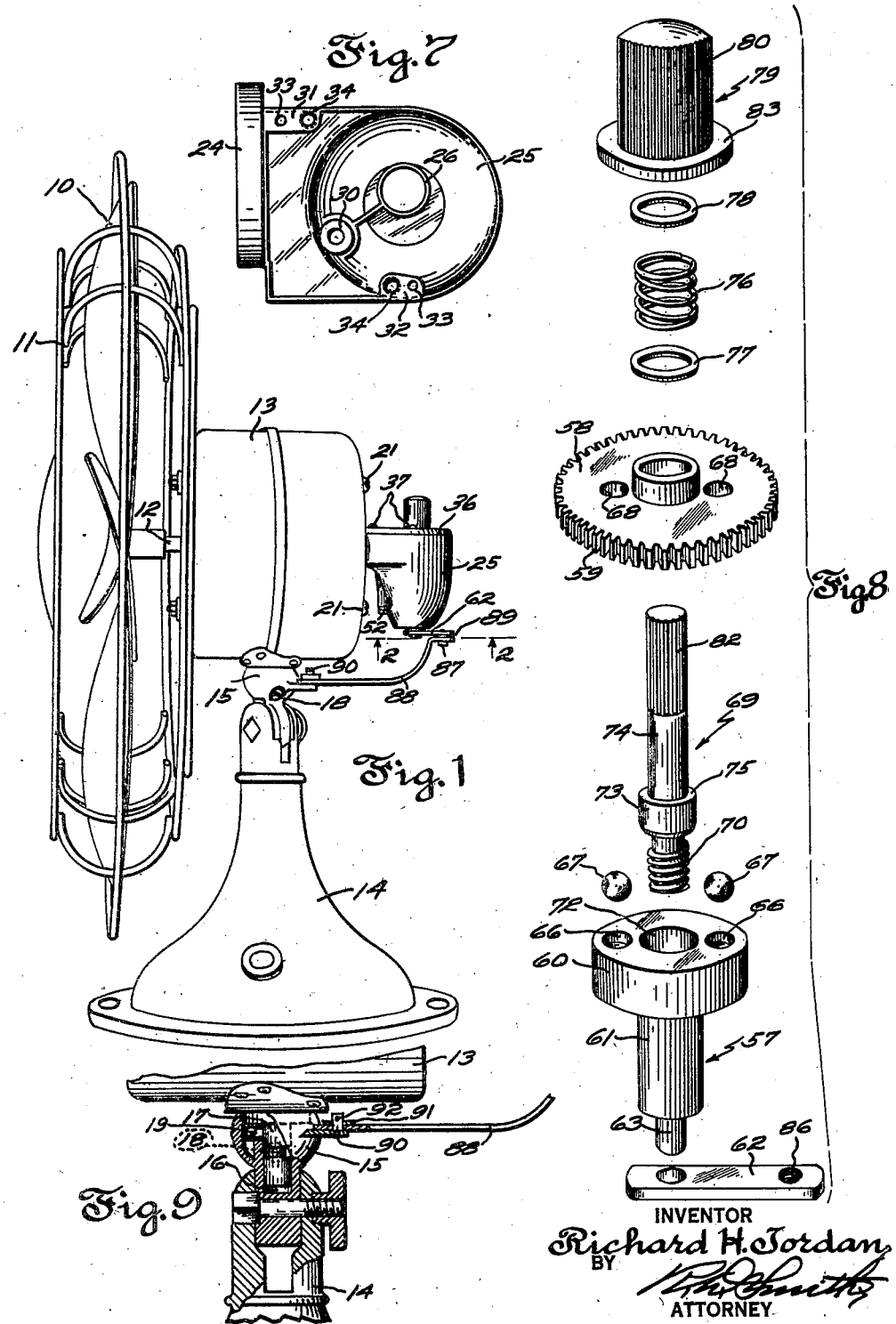

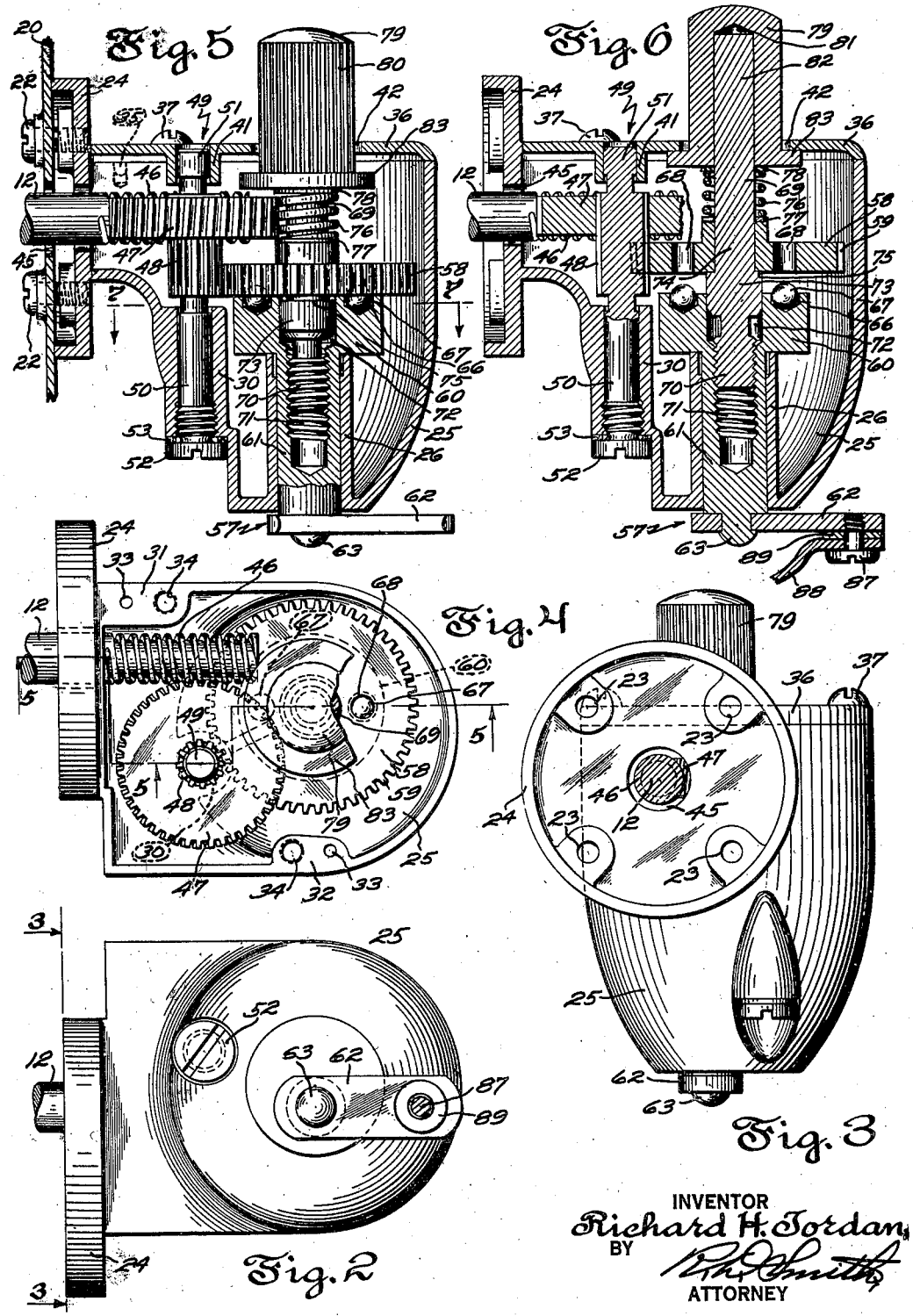

2,341,220

UNITED STATES PATENT OFFICE 2,341,220

FAN OSCILLATOR WITH MOTOR CARRIED CLUTCH CONTROL

Richard H. Jordan, Hamden, Conn., assignor to The A. C. Gilbert Company, New Haven, Conn., a corporation of Maryland Application November 14, 1940, Serial No. 365,619

21 Claims. (Cl. 230—256)

This invention relates to devices operative between a pivotally mounted motor body of an electric fan and its customary pedestal or other stationary means of support in a manner to cause the air circulating portion of the fan to oscillate with respect to such support, as well as to stop it from so oscillating when desired.

One object of the present improvements is to compact an oscillating mechanism for this purpose into a self-contained and preferably casing enclosed unit which includes an auxiliary bearing frame and may be attached removably to the external structure of the motor body and ride therewith as the latter oscillates.

A further object is to incorporate in such self-contained unit a manually operable power disconnecting clutch which likewise as a whole will oscillate with the motor body.

A further object is to dispense with the necessity of splined connections of any gear or clutch member to its shaft and instead, to permit clutching and unclutching of the power transmitting parts through the shifting movement of one gear which carries a clutch face while it slides axially in relation to another gear with which it remains in mesh.

Another object is to utilize a brake which is operated by the clutch shifting handle with the effect of retaining the motor body against oscillation when the transmission is unclutched.

Another object is to provide a yieldable yet dependable transmission of power through the clutch to the oscillating mechanism, so that when oscillating movement of the impeller guard or motor body is accidentally impeded or obstructed, the fan will not thereby be tipped over through the consequent movement of the pedestal which must take place nor will the gear teeth of the oscillator mechanism become stripped which is an even greater evil avoided by these improvements.

A further object is so to encase the working parts of the self-contained oscillating mechanism that a permanent supply of lubricant is retained while escape of lubricant by spattering or seepage is prevented so that all external surfaces of the mechanism casing will remain dry and clean.

Still further objects are to provide compactness and ruggedness in the working parts which include the power disconnecting clutch and to enable such clutch to remain dependably engaged or disengaged according to whichever condition is manually established.

The foregoing and other objects will appear clearly from the following description of a preferred embodiment of the invention, in which description reference is had to the accompanying drawings, wherein:

Fig. 1 is a perspective view of a complete electric fan incorporating my improved unitary clutch-controlled detachable oscillating mechanism.

Fig. 2 is a bottom plan view of the oscillator unit as viewed from the plane 2—2 in Fig. 1 and is drawn on an enlarged scale.

Fig. 3 shows the oscillator unit in elevation as viewed from the plane 3—3 in Fig. 2 the motor shaft appearing in cross section.

Fig. 4 is a plan view of the oscillator unit with the cover cap of the casing removed to expose the interior mechanism.

Fig. 5 is a side view of the interior working parts of the oscillator unit showing the casing in section on the planes 5—5—5 in Fig. 4.

Fig. 6 is a view similar to Fig. 5 showing more of the working parts of the mechanism in section on said planes 5—5—5 in Fig. 4.

Fig. 7 is a plan view of a bottom portion of the casing with the working parts removed therefrom as the same appears looking downward from the plane 7—7 in Fig. 5.

Fig. 8 is an exploded view of the coaxial parts of Fig. 6 which include the clutch.

Fig. 9 shows the pivotal mounting parts for the motor body in central vertical section.

The impeller or air circulating blades 10, safety guard 11, motor shaft 12 and motor stator or body 13 forming the fan motor unit of a conventional household electric fan are represented in Figs. 1 and 9 as pivotally supported upon a joint member 15 which is tiltably adjustable on pedestal 14, the bearing socket 16 in member 15 retaining the pintle 17 of the motor body 13 on ball bearing 19 by means of pintle groove engaging screw 18 which permits free oscillation of motor body 13 with respect to member 15. Motor shaft 12 protrudes through and projects from the rear wall 20 of motor body 13 which wall may comprise a portion of the end cap of the motor and which cap may itself be detachable from the remainder of the motor body as by removing holding screws 21. Cap wall 20 of the motor body may contain clearance holes to receive mounting screws 22 which engage threaded holes 23 in a disc-like mounting flange 24 of a hollow cup-like casing 25 sometimes herein referred to as the transmission case or gear case which comprises an integral casting. The walls of the bottom of this casing are extended upward into the cup-like cavity of the casing to provide a vertically elongated open-ended hollow cylindrical bearing 26. At a laterally adjacent point the casing walls are thickened and contain a vertically elongated hole providing an auxiliary vertically elongated bearing 30. The walls of the hollow casting 25 are further contoured to provide internal bosses 31 and 32 which contain dowel holes 33 and threaded holes 34 receiving respectively the dowel projections 35 carried by the removable casing cover 36 and the screws 37 which serve to hold said cover in position closing the interior of casing 25. This cover 36 has a hollow boss forming a bearing 41 coaxially aligned with bearing 30 and further contains an aperture 42 coaxially aligned with the bearing 26.

The rear end of motor shaft 12 projects into the interior of the oscillator casing through a clearance aperture 45 in the mounting flange 24 of the latter, and on it are cut worm threads 46 which are disposed to turn in mesh with a worm wheel 47. Worm wheel 47 is of relatively soft and impressionable but tough durable material such as canvas impregnated with Bakelite which can be forced tightly and concentrically on one end of spur gear teeth 48 cut directly on a vertical spindle 49 to form a pinion. Said spindle 49 has its bottom end portion 50 journaled in the bearing 30 and a top end portion 51 journaled in the bearing 41, each of these journaled end portions of the spindle being separated from the pinion teeth 48 by clearance grooves of reduced diameter. The bottom end of spindle 49 rests upon the top end of a thrust taking screw 52 whose head may clamp under it the gasket 53 to prevent leakage of lubricant. Such screw may be of hardened steel to prevent disproportional wear at this point in the mechanism since spindle 49 travels at a higher rate of speed than do some of the other rotating parts while being subjected to end thrust by its driving worm 46.

The clutch of this improved oscillator mechanism includes a driven member 57 and a driving member 58 the latter of which has teeth 59 so that it constitutes a gear constantly in mesh with pinion 48 and axially slidable without interrupting such mesh for at different times establishing and breaking the transmission of power between pinion 48 and the driven clutch member 57. The latter has a shoulder formed by its relatively large head 60 which rests on the top end of bearing 26 and also the vertically depending shank 61 which is journaled in bearing 26 and projects out of the open bottom end of the latter whereat shank 61 has an end 63 of reduced diameter which receives the horizontal crank arm 62 fixed on shank 61 by firmly peaning over the bottom extremity of shank end 63 to form a crank structure. The head 60 contains in its top surface two diametrically opposite sockets or recesses in which respectively are seated the clutch balls 67 to serve as rollable detent elements which project upwardly out of sockets 66 to an extent of slightly less than half their diameter thereby to engage respectively with the bottom ends of two diametrically opposite holes 68 contained in the combined gear and clutch member 58. Holes 68 are of a diameter to fit or be negligibly larger than the largest diameter of those portions of the balls 67 which are exposed above the top surface or clutch face of clutch member head 60. Driving clutch member 58 is maintained in coaxial relation to driven clutch member 60 while shiftable in an axial direction relative thereto by means of a vertical central staff 69 whose bottom end 70 is threaded and screws into an internally threaded hole or well 71 in the driven crank structure 57 which is integral with clutch member 60, the latter being counterbored at 72 to provide a bearing in which is slidably journaled an intermediate section 73 of the staff 69. The top portion or stem 74 of staff 69 is of reduced diameter and provides the shoulder 75 on which the driving member 58 of the clutch rests, this gear-like member 58 having rotary bearing on the staff section 74 and being constantly urged downward toward or against staff shoulder 75 by a superimposed helical spring 76 which is constantly under axial compression between a bottom thrust washer 77 and a top thrust washer 78. The latter is held down by a thumb knob or cap handle 79 which protrudes upward out of casing 25 through the aperture 42 in casing cover 36. This knob-like handle may be made of molded plastic material whose surface commonly has a higher coefficient of friction than metal peripherally grooved or roughened at 80 to provide a good finger hold and provided with a socket 81 of definite depth which affords a tight press fit on the knurled upper end portion 82 of staff 69 whereby handle 79 is made fast to the latter. Thus handle 79 rotates and is manually shiftable about an axis parallel with the axis of oscillation of the fan. This handle further has the flange 83 of larger diameter than aperture 42 which flange is definitely spaced from staff shoulder 75 by thrusting staff end 82 fully into the definite depth of socket 81.

The aforesaid horizontal crank arm 62 contains the threaded hole 86 to receive a shouldered pivot screw 87 which serves in the oscillation linkage pivotally to connect the gyrating end of a link 88 to crank arm 62, a loose thrust washer 89 intervening therebetween. The stationed end of link 88 is pivotally anchored to the tilt joint member 15 by a pivot stud 90 with which this link is kept in engagement by a thrust washer 91 and cotter pin 92, or other suitable means.

In operation, the worm 46 on motor shaft 12 rotates in unison with the fan impeller 10 and constantly drives worm wheel 47 of the train of reduction gears in unison with pinion 48 at reduced speed so long as the fan is running. When it is desired that the fan shall not oscillate the clutch handle 79 is unscrewed upward in unison with staff 69, or may merely be held from turning while crank structure 57 continues to rotate, whereupon staff 69 backs out of the threaded well 71 in the crank structure while the latter is held to make this possible first by the cling of clutch member 58 to clutch member 57, the latter being in mesh with pinion 48, and thereafter by link 88 and crank arm 62 until the driving clutch member or gear 58 becomes lifted sufficiently to clear the clutch balls 67. In this condition, balls 67 are prevented from jarring loose from their sockets 66 because the rims of sockets 66 are peaned slightly inward so that the maximum diameter of each ball is loosely imprisoned within its socket so that the ball can freely turn. Also in this position of the parts as shown in Fig. 6, pinion 48 continues to rotate the driving clutch member of gear 58 in idling relation to the staff 69 whose own rotation becomes resisted by the braking effect of the upward thrust of a brake element or frictional surface of flange 83 on handle 79 against a thrust resisting brake abutment afforded by the bottom inside surface of the casing cover 36 bordering aperture 42 with sufficient force to arrest stem 74 while gear 58 continues to rotate thereabout. At the same time head 60 of clutch member 57 is thrust downward against the top end of frame bearing 26 and thus produces frictional resistance sufficient to quite positively prevent turning of the crank structure. Since staff 69 and member 61 are thus kept from turning, crank arm 62 will in effect be locked against rotation and there will be no oscillation of the fan body on its pivotal mounting 16, 17.

When it is desired that the motor body of the fan shall oscillate, the staff 69 by means of handle 79 is screwed downward into the threaded well 71 of the crank structure including driven clutch member 57 until first the clutch balls 67 engage with the holes 68 in the driving shaft member or gear 58 and then until the bottom face of member becomes pressed down into engagement with the top face of member 57 by the tension in spring 76. In this manner staff 69 may be screwed down to so low a position that its shoulder 75 is spaced below the bottom face of gear 58 as shown in Fig. 5. At the same time clearance is brought into play between the handle flange 83 and the cover 36 as shown in Fig. 5 whereupon the opposition to the turning of staff 67 formerly offered by these parts and by the thrust of head 62 against the end of bearing 26 is removed and the engagement of balls 67 with the revolving holes 68 in gear 58 together with the friction between contacting surfaces of members 57 and 58 yieldingly urge the driven clutch member 57 and its crank arm 62 to rotate. The revolving pivot screw 87 coacts in usual manner with the swingable end of link 88 to cause motor body 13 and fan impeller 10 to oscillate. Thus in well known manner the stream of air generated by impeller 10 is caused to sweep about back and forth in an arc of constantly shifting directions.

When the clutch control handle 79 is manually turned clockwise in Fig. 4 to cause clutch engagement, member 57 is at first kept from turning with staff 69 by means of its link connected crank arm 62, but after balls 67 and holes 68 have become engaged member 57 is also thereby kept from turning while handle 79 is screwed down to place desired pressure on spring 76. This of course may be done either while handle 79 is riding on its auxiliary frame or casing 25 with the oscillations of motor body 13 or while such motor body and auxiliary frame are standing still.

The screw threads on staff 69 and in well 71 are right handed or left handed depending on the direction of rotation of the clutch members 58 and 57 for transmitting power from the former to the latter. Preferably these threads will be so inclined that any frictional tendency of staff 69 to be rotated by gear 58 in advance of the ability of crank structure 57 to follow will turn the staff farther into the threaded well and thereby increase the pressure which sets up an impelling cling between the engaging clutch faces of parts 58 and 60 and of parts 60 and 26. Thus assurance of the fan continuing to oscillate when it is once set to oscillating is increased.

There remains to be explained a very important and automatic accomplishment of the oscillator mechanism which has been described. Assuming that while the fan is running and oscillating with the clutch conditioned as in Fig. 5 some obstacle accidentally blocks the attempted oscillation of guard 11 or motor body 13 relative to pedestal 14 and thereby acts through link 88 to resist rotation of crank arm 62, the consequent arresting of crank shank 61 and staff 69 while gear 58 continues to be rotated by pinion 48 will force the detent holes 68 temporarily out of register with balls 67, the consequent yielding of spring 76 permitting the bottom or clutch face of gear 58 to ride up onto the top of balls 67 while the latter roll freely in their sockets to facilitate this.

After each half revolution of holes 68 relative to the positionally arrested balls 67 under these emergency circumstances, the former will again and again register with the latter and at each such coming into register of detent holes and balls the gear 58 will drop into face contact with clutch part 60 under the downward urge of spring 76 but will immediately thereafter again ride up onto the top of the balls and continue rotating so long as the crank structure remains obstructed against rotation. However, as soon as the accidental obstruction is removed, holes 68 upon their next "finding" balls 67, will remain in engaging register therewith and cause the crank structure to resume its rotation for causing oscillation of the fan.

The foregoing described yielding or safety feature of these improvements enables an oscillating fan embodying my invention harmlessly to cease oscillating when its oscillating movement is obstructed instead of tipping over or stripping gear teeth of the oscillator mechanism as would occur in an ordinary oscillating fan.

I may refer to the bottom surface of gear 58 and to the top surface of the crank structure which includes head 60 as clutch surfaces and it will be understood that clutch surfaces for the purposes of this invention can be otherwise formed. In this respect and in all other respects in which the exact forms and arrangement of parts may readily be modified within the spirit and teachings of this disclosure, my invention as defined in the appended claims will be understood to reside in and include all fair substitutes and equivalents for these particular forms and arrangements of parts.

I claim:

1. A motor driven oscillating fan including the combination of, an oscillatory fan motor unit, a support for said unit determining the axis of oscillation thereof, a transmission case carried by said unit, a motor shaft extending into said case, a crank structure journaled in and projecting outside of said case, oscillation linkage connecting said crank structure to said support, and transmission mechanism in said case including axially separable cooperative clutch faces, driven and driving connections permanently coupling said clutch faces respectively with said shaft and with said crank structure, a spring constructed and arranged to urge one of said faces axially toward the other of said faces, and a shiftable transmission control handle carried by said mechanism in a position to be manually accessible outside of said case, together with connections between one of said clutch faces and said handle constructed and arranged to enable said handle to force said one of the clutch faces axially away from the other clutch face.

2. A motor driven oscillating fan as defined in claim 1, together with a staff in coaxial relation to said crank structure having threaded engagement therewith and carrying the said handle, the said spring having one end restrained from axial movement relative to said staff.

3. A motor driven oscillating fan as defined in claim 1, together with a staff in coaxial relation to said crank structure having threaded engagement therewith and carrying the said handle, the said spring having one end restrained from axial movement relative to said staff, and a stop on said staff limiting spring caused movement of said one of said clutch faces.

4. A motor driven oscillating fan as defined in claim 1, in which one of the said clutch faces contains at least one detent opening, together with a ball retained loosely in and projecting from a socket in the other of the said clutch faces in position partly to occupy said detent opening.

5. A motor driven oscillating fan as defined in claim 1, together on a brake device riding bodily with and in adjustable relation to the said crank structure in a manner to be shifted into and away from a position to engage with the said case for resisting rotation of said crank structure relative thereto.

6. A motor driven oscillating fan as defined in claim 1, in which the said handle rides bodily with and in adjustable relation to the said crank structure, together with a brake element riding bodily with and in adjustable relation to said crank structure in a manner to be shifted into and away from a position to engage with the said case for resisting rotation of said crank structure relative to said case.

7. A motor driven oscillating fan as defined in claim 1, together with a brake element riding bodily with and in adjustable relation to the said crank structure in a manner to be shifted into and away from a position to engage with the said case for resisting rotation of said crank structure relative to said case, the said clutch shifting handle being operatively associated with said brake element in a manner to shift the latter relative to said crank structure into and away from said case engaging position.

8. A motor driven oscillating fan as defined in claim 1, in which the said handle rides bodily with the said crank structure relative to the said case, together with a brake element carried and operated by said handle, said handle being adjustable relative to said crank structure in a manner to shift said brake element into and away from a position to engage with said case for resisting rotation of said crank structure relative to said case.

9. A motor driven oscillating fan as defined in claim 1, together with a brake surface carried on the said crank structure in a manner to be thrust against the said transmission case for resisting rotation of said crank structure relative thereto.

10. A motor driven oscillating fan including the combination defined in claim 1, in which the said transmission case includes a hollow structure depending below the said clutch faces equipped internally with an elongated upstanding hollow boss in which the said crank structure is journaled and providing an annular well extending about said boss adapted to retain lubricant draining from the said transmission mechanism.

11. In an unclutching transmission for selectively causing or stopping oscillation of a motor driven fan, the combination with the oscillatory fan and motor body, of a spaced apart rotor bearing and brake abutment fixedly carried by said motor body to oscillate therewith, a crank structure journaled in said rotor bearing connected and arranged to impart oscillation to said motor body, a driven clutch member carried by said crank structure, a rotary brake element facing said brake abutment, a staff fixed to said brake element extending to said crank structure, a driving clutch member facing said driven clutch member having a central aperture occupied by said staff and connected to be rotated relatively to said staff by the fan motor, and manually operable means to shift said driving clutch member and said brake element in unison selectively away from said brake abutment toward said driven clutch member or away from said driven clutch member toward said brake abutment respectively for causing said motor body to oscillate and for preventing oscillation thereof.

12. In an unclutching transmission as defined in claim 11, the combination defined in said claim in which the said manually operable means include a handle extending through the said thrust abutment, and a spring compressed between said handle and the said driving clutch member.

13. In an unclutching transmission as defined in claim 11, the combination defined in said claim in which the said staff has threaded engagement with the said crank structure, and the said manually operable means include a handle fixed on said staff for turning the latter.

14. In an unclutching transmission as defined in claim 11, the combination defined in said claim in which the said staff has threaded engagement with the said crank structure, and the said manually operated means include a handle extending through the said thrust abutment together with a spring compressed between said handle and the said driving clutch member.

15. A motor driven oscillating fan including in combination with an oscillatory motor body, a stationary support for said body determining the axis of oscillation of said fan, a transmission case mounted in fixed relation to said motor body to oscillate in unison therewith, a fan shaft extending from said motor body into said case, a crank structure journaled in and projecting outside said case, oscillation linkage connecting said crank structure to said support, sections of a ball clutch inside said case operatively connected respectively to said shaft and to said crank structure and provided with sockets, resilient means urging said clutch sections together at least one clutch ball rollably engageable with said sockets in both clutch sections in a manner to be forcibly pressed against one of said clutch sections by the other clutch section under the urge of said resilient means, and a handle projecting outside said case connected and arranged to separate one of said sections from said clutch ball.

16. A motor driven oscillating fan including in combination with an oscillatory motor body, a stationary support for said body determining the axis of oscillation of said fan, a transmission case mounted in fixed relation to said motor body to oscillate in unison therewith, a fan shaft extending from said motor body into said case, a crank structure journaled in and projecting outside said gear case, oscillation linkage connecting said crank structure to said support, a brake and sections of a ball clutch inside said case said brake and one of said sections being connected to said shaft and the other of said sections being connected to said crank structure and both of said sections being provided with sockets, at least one clutch ball rollably engageable with said sockets, spring means urging said clutch sections together, and a handle for shifting one of said clutch sections and said brake in unison carried by said mechanism and projecting outside said case and arranged and connected when manipulated to separate one of said clutch sections from said clutch ball.

17. In automatic safety unclutching fan oscillating mechanism, the combination with a fan motor, of a rotatable driven member for imparting oscillation to said fan having a clutch face with at least one detent socket sunk therein, a driving member having a clutch face and connected to be rotated by said motor in coaxial relation to said driven member one of said members being further constructed and arranged by axial movement impellingly to engage and disengage with the other of said members, resilient means yieldably acting on one of said members to urge one of said clutch faces toward the other clutch face, a rollable detent element retentively held in said socket in a manner to bear on the bottom of said socket while protruding therefrom, and at least one recess formed in the other of said clutch faces in position to at times register with and admit said rollable element at least partially into said recess whereupon rotation of one of said members relative to the other member causes said element alternately to roll into and roll out of said recess and thereby causes alternate separating and closing movements of said one of said clutch faces against the resistance of said resilient means.

18. A motor driven oscillating fan including in combination with an oscillatory motor stator, a stationary support determining the axis of oscillation of said stator, a gear case mounted in fixed relation to said stator to oscillate bodily therewith, a fan shaft extending from said stator into said gear case, a crank structure journaled in and projecting outside said gear case, oscillation linkage connecting said crank structure to said support, mechanism including a train of reduction gears and cooperative separable clutch faces confined in said case and arranged to transmit driving power from said fan shaft to said crank structure, the case confined gear at the end of said train nearest said crank structure carrying one of said clutch faces and being mounted to slide axially in relation to another case confined gear of said train while simultaneously remaining in mesh therewith, and a handle projecting outside said case arranged and connected to said face carrying gear in a manner to cause the latter to slide axially for separating said clutch faces.

19. In fan oscillating mechanism, the combination with a fan motor body, a motor shaft, a drive worm on said shaft, a worm wheel in mesh with said worm having a hub portion composed of impressionable material, at least one bearing supported on said motor body, a metallic spindle journaled in said bearing having elongated pinion teeth cut thereon said hub portion of the worm wheel being forced over said spindle and into engagement with a portion of the length of said pinion teeth with a tight press fit on the latter, and a driven gear in mesh with a different portion of the length of said pinion teeth for imparting oscillation to said fan.

20. In unclutching fan oscillating mechanism, the combination with a fan motor body, of a transmission unit carried on said body for imparting oscillation to the fan including reduction gears, a clutch, a metal housing enclosing said gears and clutch having an outlet, a handle connected within said housing to operate said clutch and extending through said outlet to be manipulated outside of said housing, and a brake flange of molded plastic material having a higher coefficient of friction than metal carried by said handle inside of said housing in a manner to be selectively positioned to engage with or to be spaced from said housing, said handle and flange being rotatable with said gear train when spaced from said housing.

21. A motor driven oscillating fan including in combination with an oscillatory motor stator, a stationary support determining the axis of oscillation of said stator, a bearing frame mounted in fixed relation to said stator to oscillate bodily therewith, a fan shaft extending from said stator toward said frame, a crank structure journaled in said bearing frame including a train of reduction gears and cooperative separable clutch faces arranged to transmit driving power from said fan shaft to said crank structure, the reduction gear at the end of said train nearest said crank structure carrying one of said clutch faces and being mounted to slide axially in relation to another reduction gear of said train while simultaneously remaining in mesh therewith, and a handle connected to said clutch face carrying gear in a manner to cause the latter to slide axially for separating said clutch faces.

RICHARD H. JORDAN.

CERTIFICATE OF CORRECTION.

Patent No. 2,341,220. February 8, 1944.

RICHARD H. JORDAN.

It is hereby certified that error appears in the printed specification of the above numbered patent requiring correction as follows: Page 4, first column, line 12, for the word "on" read --with--; line 13, for "with" read --on--; and that the said Letters Patent should be read with this correction therein that the same may conform to the record of the case in the Patent Office.

Signed and sealed this 25th day of April, A. D. 1944.

Leslie Frazer

(Seal) Acting Commissioner of Patents.